United States Patent [19]

Drawert et al.

[11] Patent Number: 4,966,945

[45] Date of Patent: Oct. 30, 1990

[54] COATING METHOD USING AQUEOUS GLYCIDYL COMPOUND-AMINE HARDNER-THERMOPLASTIC RESIN COMPOSITIONS

[75] Inventors: Manfred Drawert, Froendenberg; Horst Krase, Hamm; Hans D. Skoda, Kamen, all of Fed. Rep. of Germany

[73] Assignee: Schering AG, Berlin and Bergkamen, Fed. Rep. of Germany

[21] Appl. No.: 272,764

[22] Filed: Nov. 17, 1988

Related U.S. Application Data

[63] Continuation-in-part of Ser. No. 44,606, May 1, 1987, abandoned.

[30] Foreign Application Priority Data

May 17, 1986 [DE] Fed. Rep. of Germany ....... 3616824

[51] Int. Cl.$^5$ ..................... C08L 63/02; C08L 79/02
[52] U.S. Cl. .................................. 525/113; 525/420; 525/420.5; 525/438; 525/454
[58] Field of Search ............. 525/113, 420.5, 420, 525/438, 454

[56] References Cited

U.S. PATENT DOCUMENTS

| | | | |
|---|---|---|---|
| 3,507,817 | 4/1970 | Motolsky et al. | 525/54.23 |
| 4,025,578 | 5/1977 | Siebert | 528/113 |
| 4,089,826 | 5/1978 | Moss et al. | 523/404 |
| 4,698,396 | 10/1987 | Drawert et al. | 525/420.5 |

FOREIGN PATENT DOCUMENTS

| | | |
|---|---|---|
| 0047364 | 3/1982 | European Pat. Off. . |
| 2073222 | 10/1981 | United Kingdom . |
| 2087895 | 6/1982 | United Kingdom . |

OTHER PUBLICATIONS

The Encyclopedia of Chemistry, edited by Hempel and Hawley, Van Nostrand Reinhold Co., New York, 1973, p. 402.

The Condensed Chemical Dictionary, Eighth Edition, edited by Hawley, Van Nostrand Reinhold Co., New York, 1971, p. 350.

*Primary Examiner*—John C. Bleutge
*Assistant Examiner*—Robert E. L. Sellers, II
*Attorney, Agent, or Firm*—Curtis, Morris & Safford

[57] ABSTRACT

A method for coating or printing a substrate by applying thereto a coating or printing ink vehicle which is a solution of a curable mixture of synthetic resins, evaporating a solvent therefrom a give a physically dry and clear film, and maintaining said film at or slightly above room temperature to cure or harden said vehicle, said vehicle including a glycidyl compound, one or more amines as curing or hardening agents for said glycidyl compound, a thermoplastic resin having free carboxyl groups which is inert at the aforementioned curing temperatures, a solvent, and optional commonly used auxiliaries.

9 Claims, No Drawings

COATING METHOD USING AQUEOUS GLYCIDYL COMPOUND-AMINE HARDNER-THERMOPLASTIC RESIN COMPOSITIONS

This application is a continuation-in-part of application ser. No. 044,606 filed May 1, 1987, and now abandoned.

The present invention relates to methods for coating or printing a substrate with a coating or printing vehicle comprising a curable mixture of synthetic resins, which vehicle, after evaporation of a solvent therefrom, gives a physically dry and clear film and cures at room temperature or slightly higher temperatures, and to such a composition.

Curable mixtures of synthetic resins comprising epoxy resins and amine curing agents are known to be used to produce surface coatings and printing inks. As a rule, however, these systems are printed exclusively out of organic solvents.

It is further known to use thermoplastic resins as one component printing ink vehicles, which, however, also have to be dissolved in organic solvents.

In view of the steadily growing awareness of the environment, it has therefore been necessary to adopt costly measures for recovering these organic solvents.

Many attempts have therefore been made to replace the organic solvent in whole or in part with water as the solvent.

For example, amine curing agents present in some curable mixtures of synthetic resins were mixed with inorganic or organic acids until solubility in water was secured through salt formation. Epoxy resins were then dispersed directly in these curing agent solutions or added to them as a dispersion or emulsion prior to use, it generally being necessary to use also further emulsifiers, protective colloids, and surface active agents. The surfaces obtained after the solvent has been evaporated are not tack free.

It has also been sought to provide water solubility for one component systems comprising thermoplastic resins such as polyamides, polyester amides, polyesters, polyurethanes, polyacrylates, styrene/maleic acid copolymer resins, vinyl acetate/crotonic acid copolymers, and maleinate resins. The procedure usually followed is to produce resins with moderately high to high content of carboxyl groups (quantified by indication of the acid numbers) and then to neutralize them by adding inorganic or organic bases.

Resins of this type containing carboxyl groups are part of the prior art and are described in U.S. Pat. Nos. 3,355,409, 3,778,394, 3,844,991, 3,882,090, 3,945,983, 4,365,041, 3,563,937, and 3,533,811, and in published German patent applications DAS 1,794,303 and 1,794,309, for example.

After neutralization with ammonia or readily volatile amines, the resins are water soluble and in part also sufficiently water dilutable. These ink films also in part satisfy requirements concerning adhesion, gloss, and printability.

However, regardless of the type of resin used, the films fail to meet practical requirements particularly with respect to their resistance to water, aqueous solutions of acids, alkalis, and detergents.

The different variations involving readily volatile amines and ammonia also fell short of bringing about a radical improvement in the water resistance of the cured film.

The use of water soluble epoxy resins and curing agents as an alternative was deemed inadvisable since it was believed that the known water soluble aliphatic epoxy resins possessed few or none of the resistance properties normally expected of epoxy resins.

In addition to optimization of the known formulations, possible measures for improving the film quality which were considered involved extensive modification of the drying devices on the printing presses. However, because of the material properties of the substrates, drying temperatures must be maintained within close limits, at least in part.

Since it was not possible using the known state of the art to overcome the existing drawbacks by the methods heretofore employed in this field from the viewpoint of the vehicle alone, a novel method of a different kind was sought which would permit the production of water soluble and water dilutable printing ink vehicles that are printable with printing presses under the usual conditions, to give a cured ink film having, in particular, excellent resistance to water and aqueous systems in addition to the desirable properties of the prior art systems.

The present invention thus has as its object compositions comprising curable mixtures of synthetic resins which, after evaporation of a solvent therefrom, give physically dry and clear films and which cure at room temperature or slightly higher temperature, useful as vehicles for surface coatings and printing inks for intaglio, flexographic, and screen printing. In such compositions, the synthetic resin mixtures comprise (A) at least one aliphatic glycidyl compound having more than one epoxy group per molecule; and (B)
(1) an aliphatic amine of the formula $$H_2N-(CHR)_x-NH_2 \qquad (I)$$

wherein R may be hydrogen or alkyl having from 1 to 4 carbon atoms and x is an integer from 2 to 6, and/or (2) a polyalkylene polyamine of the formula $$H_2N+(CHR)_x-NH+_yH, \qquad (II)$$

wherein R and x may have the meanings given above and y is an integer from 2 to 4, and/or (3) a polyether amine of the formula $$H_2N-(CH_2)_n-O+R^1-O)-_z(CH_2)_{\overline{n}}NH_2, \qquad (III)$$

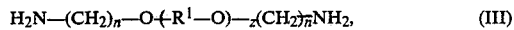

wherein $R^1$ is linear or branched alkyl having from 1 to 4 carbon atoms, z is 0, 1, 2 or 3, and n is an integer from 2 to 5, and/or (4) a heterocyclic amine of the formula

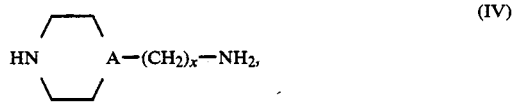

wherein A is C or N and x is an integer from 2 to 6, and/or (5) an alkanolamine of the formula

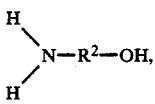
(V)

wherein $R^2$ is $-(CRR)_x-$ and R and x have the meanings given above, or $R^2$ is $-(CH_2)_2-O-(CH_2)_2-$, and/or (6) an adduct having free amine groups formed between
(a) an aliphatic glycidyl compound according to (A) and
(b) at least one of the amines according to (B)(1) to (4) and optionally up to 50 equivalent percent of an amine according to (B)(5), and wherein from 0.8 to 1.2 moles, and preferably 1 mole, of amine is used per epoxy group according to (a);

(C) a thermoplastic resin having free carboxyl groups and an acid number from 40 to 200, there being from 1 to 10, and preferably from 1 to 4, amino groups of one or more of the amines according to (B) per carboxyl group according to (C);

(D) a solvent or solvent mixture; and, optionally, (E) pigments, dyes, accelerators, reactive diluents, extenders, wetting and flow control agents, and modifiers.

The glycidyl compounds (A) used in accordance with the invention are water soluble glycidyl ethers of aliphatic linear or branched alcohols such as hexanediol, neopentyl glycol, glycerol, trimethylolpropane, diglycerol, or pentaerythritol, which have epoxy values ranging from 0.4 to 0.7, and particularly from 0.6 to 0.7.

The use of mixtures of two or more of these glycidyl ethers is possible, as is the concurrent use of in particular, provided that the mixture contains an average of more than one epoxy group per molecule.

The aliphatic amines according to (B) used in accordance with the invention are diamines of the formula $$H_2N-(CHR)_x-NH_2, \quad (I)$$

wherein x may have a value from 2 to 6 and R is hydrogen or alkyl having from 1 to 4 carbon atoms, and in particular methyl, such as diaminoethane, diaminopropane, diaminobutane, diaminohexane, 2,2,4(4,4,2)-trimethyl-1,6-diaminohexane; and/or polyalkylene polyamines of the formula $$H_2N-[(CHR)_x-NH]_yH, \quad (II)$$

wherein R and x may have the meanings given above an y has a value from 2 to 4, such as diethylenetriamine, triethylenetetramine, tetraethylenepentamine, and the analogous polypropylene polyamines, as well as the polyamides obtained by the cyanoethylation of polyamines, and particularly of ethylenediamine, followed by hydrogenation (cf. pamphlet of BASF AG, 1976); and/or polyether amines of the general formula $$H_2N-(CH_2)_n-O-(R^1-O-)_z-(CH_2)_n NH_2, \quad (III)$$

wherein $R^1$ may be optionally substituted alkyl having from 1 to 4 carbon atoms, z is 0, 1, 2 or 3, and n is an integer from 2 to 5, such as 1,7-diamino-4-oxaheptane, 1,7-diamino-3,5-dioxaheptane, 1,10-diamino-4,7-dioxadecane, 1,10-diamino-4,7-dioxa-5-methyldecane, 1,11-diamino-6-oxaundecane, 1,11-diamino-4,8-dioxaundecane, 1,11-diamino-4,8-dioxa-5-methyl-undecane, 1,11-diamino-4,8-dioxa-5,6-dimethyl-7-propionyl-undecane, 1,13-diamino-4,10-dioxatridecane, 1,13-diamino-4,7,10-trioxa-5,8-dimethyltridecane, 1,14-diamino-4,11-dioxatetradecane, 1,14-diamino-4,7,10-trioxatetradecane, 1,16-diamino-4,7,10,13-tetraoxa-hexadecane, 1,20-diamino-4,17-dioxaeicosane, and particularly 1,12 diamino-4,9-dioxaodecane; and/or heterocyclic amines of the formula

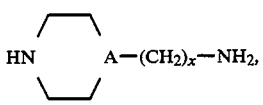
(IV)

wherein A may be carbon or nitrogen and x is an integer from 2 to 6, such as n-aminoethylpiperazine in particular; and/or alkanolamines of the formula $$H_2N-R^2-OH,$$

wherein $R^2$ is $-(CRR)_x-$ and R and x have the meanings given above, or $R^2$ is $-(CH_2)_2-O-(CH_2)_2-$, such as 2-amino-2-methyl-1-propanol, or 1-hydroxy-3-oxa-5-aminopentane; and/or adducts with free amino groups formed between
(a) an aliphatic glycidyl compound according to (A) and
(b) at least one of the amines according to (B)(1) to (B)(4), and optionally up to 50 equivalent percent, based on the total amount of amine, of one of the amines according to (B)(5), and wherein from 0.8 to 1.2 moles, and preferably 1.0 mole, of the amine is used per epoxy group according to (a) and the epoxy compound is preferably an adduct of hexanediol diglycidyl ether with ethylenediamine.

These amine compounds are reactive with the epoxy groups of the glycidyl compounds at room temperature or slightly above and serve as curing or hardening agents for the glycidyl compounds in the composition.

The thermoplastic resins having free carboxyl groups which are present in the compositions according to the invention are, on the other hand, inert at these curing or hardening temperatures. As known in the art, carboxyl groups are not reactive with epoxy groups except at elevated temperatures and although they can enter into reversible salt forming reactions with amines (thereby increasing the water solubility of the resins containing the free carboxyl groups), carboxyl groups do not react with amines to form amides except at elevated temperatures. The resins are present in the composition because of the physical properties which they impart to the coatings or printed films: the carboxyl groups which are present impart water solubility to the resins.

The resins is question are polyamides, polyester amides, polyesters, polyurethanes, polyacrylates, polymethacrylates, styrene/maleic acid polymers, vinyl acetate/crotonic acid copolymers, and maleinate resins commonly used in this field. The type and amount of the components used to produce them and the manufacturing methods are described a length in the pertinent technical literature. All of these resins may be used in accordance with the invention provided that they are solid and nontacky at room temperature and are water dilutable after salt formation.

Polyaminoamides formed between a polycarboxylic acid and a polyamine and polyesteramides formed between a polycarboxylic acid and a component which contains both amino and hydroxy groups and comprises one or more members selected from the group consisting of alkanolamines, polyamines, and polyols, are preferred, and such compounds formed with polymerized fatty acids are specially preferred.

Polymerized fatty acids are suitable for use as polycarboxylic acids in addition to aliphatic, cycloaliphatic, and aromatic acids such as adipic acid, sebacic acid, azelaic acid, pimelic acid, isophthalic acid, terephthalic acid, phthalic acid, 1,4(1,3)-cyclohexanedicarboxylic acid, 1,4(1,3)-carboxymethylcyclohexane, optionally together with short chain monocarboxylic acids. These polymerized fatty acids are known as dimeric fatty acids and are produced by the polymerization by known methods of unsaturated monobasic aliphatic fatty acids having from 16 to 22 carbon atoms. Typical dimeric fatty acids which are on the market have approximately the following composition:

| monomeric acids | 0–5 wt. %; |
|---|---|
| dimeric acids | 60–95 wt. %; |
| trimeric and higher polymerized acids | 1–35 wt. %. |

The content may vary within these limits, depending on the origin of the monomer, the polymerization process, and the conditioning method.

Suitable polymer formers for production of the polyamides and polyesteramides/polyesters are the usual aliphatic and cycloaliphatic heterocyclic compounds, and optionally also aromatic compounds, such as ethylenediamine, propylenediamine, hexamethylenediamine, trimethyl hexamethylenediamine, dimerylamine, isophoronediamine, 3,3'-dimethyl-4,4'-diaminodiphenylmethane, 3,3'-dimethyl-4,4'-diaminodicyclohexylmethane, 4,4'-diaminodiphenylmethane, xylylenediamine, piperazine, N-aminoethylpiperazine, dipiperazinylpropane, polyether amines of formula (III), alkanolamines such as ethanolamine, propanolamine, and diethanolamine, amino acids or lactams such as aminocaproic acid, 11-aminoundecanoic acid, and laurolactam, short-chain alcohols such as 1,2-dihydroxyethane, 1,3-dihydroxybutane, and 1,6-dihydroxyhexane, and polyether polyols produced by the alkoxylation, and particularly by the ethoxylation and/or propoxylation, of diols. Mixtures of copolymers or cocondensates of the various resin types may also be used.

Resins with this composition and their production are known in this field and are described in the literature cited above, for example. They have acid numbers ranging from 40 to 200, and more particularly from 50 to 120. The terms acid and amine number are commonly used in this field to quantify the free carboxyl groups or amine groups, respectively, and are stated in milligrams of KOH per gram of substance.

To secure sufficient water or water/alcohol solubility, the free carboxyl groups of the thermoplastic resins may be mixed directly with an excess of one or more of the amine compounds listed above, in such ratio that there are from 1 to 10, and more particularly from 1 to 4, amino groups of the amines per carboxyl group.

However, it is also possible to form an adduct of the epoxy resin with excess amines according to (B), using from 1 to 1.2 moles of polyamine per epoxy group, and then to add this adduct to the resin containing carboxyl groups for salt formation. Preferred adducts are those of ethylenediamine with glycidyl ethers of hexanediol, glycerol, and diglycerol.

The preferred procedure, however, is to use water or a water/alcohol mixture in a ratio by weight of from 1:9 to 9:1 as an initial charge, the preferred alcohol being ethanol, n-propanol, or isopropanol, and then successively to add the three components in the desired order, preferably amine—epoxy resin—thermoplastic resin, and dissolve them heated. The components may be added all at once or in portions. If added in portions, the alkanolamines are preferably added last. In accordance with a less preferred procedure, commonly used tertiary amines or tertiary alkanolamines are added in place of or in addition to the alkanolamines. However, since some of them are highly volatile during printing, they will pollute the environment.

The optimum quantitative ratios of the curable mixture are determined by the nature of the starting materials used in each case and should be selected (in keeping with guidelines known per se) so that a nontacky film surface is obtained immediately after evaporation of the solvent, that is the water or the water alcohol mixture, but the solubility in and dilutability with water of the curable mixture still meets practical requirements. The ratio of epoxy resin and amine (salt) for preparation of the curable mixture may also be variable, consistent with the quantitative ratios and conditions given above, over the range from 0.5:1 to 1.5:1, and more particularly from 0.7:1 to 1.3:1, and preferably from 0.95:1 to 1.05:1, based on epoxy groups and reactive amino hydrogen atoms. For curing, that is, reaction with the amino groups, the water soluble glycidyl ethers of glycerol and diglycerol are preferably used. The reaction between these components proceeds during storage at room temperature and after about seven days has progressed to the point where the films can be subjected to loading, particularly by water and aqueous mixtures.

Suitable substrates which can be printed with the printing inks used in accordance with the invention, optionally with the concurrent use of known pigments, dyes, accelerators, reactive diluents, wetting and flow-control agents, such as ethylene glycol monomethyl-, monoethyl-, or monobutyl-ethers, are the known packaging and advertising materials, such as plastic foils made of polyethylene, polypropylene, or polyester, paper, boxboard, and metal coated foils.

A better understanding of the invention and of its many advantages will be had from the following examples, given by way of illustration.

Preparation of resin solutions

EXAMPLE A 115.0 g of water, 113.5 g of isopropanol, 5.0 g of ethylene diamine, and 13.0 g of hexanediol diglycidyl ether were weighed into a 750 ml Erlenmeyer flask and heated with stirring to 60° C. to 70° C. over 5 hours. After cooling, 75 g of polyamide resin (acid number 60) were further weighed in and dissolved hot with stirring. After the resin had gone into solution, 5.0 g of 2-amino-2-methyl-1-propanol were stirred in, followed by cooling.

EXAMPLE B 115.0 g of water, 113.5 g of isopropanol, 5.0 g of ethylenediamine, 5.0 g of 2-amino-2-methyl-1-propanol, and 13.0 g of hexanediol diglycidyl ether were weighed into a 750 ml Erlenmeyer flask and heated with stirring to 60° C. to 70° C. over 5 hours. After cooling, 75 g of polyamide resin (acid number 60) were further weighed in and dissolved hot with stirring, followed by cooling.

EXAMPLE C 115.0 g of water, 119.5 g of isopropanol, 5.0 g of ethylenediamine, 13.0 g of hexanediol diglycidyl ether, and 75.0 g of polyamide resin (acid number 60) were weighed into a 750 ml Erlenmeyer flask and dissolved at the boiling point. After they had gone into solution, 5.0 g of 2-amino-2-methyl-1-propanol were stirred in, followed by cooling.

Choosing glycidyl compounds from following Table 1, amines from following Table 2, thermoplastic resins from following Table 3, and using aforementioned procedures A–C, 34 resin solutions identified in following Table 4 were prepared. More in particular, procedure B was used to prepare solution No. 1, procedure A was used to prepare solution No. 16, and procedure C was used to prepare all remaining solutions, including three comparison solutions identified in Table 4 as C1–C3.

Ink films were prepared from these solutions as using the criteria and procedures described below: The test results are given in following Table 5.

Production of ink films

For further processing, 250.0 g each of the solutions according to Examples 1 to 3 were pigmented with 30.0 g of a red pigment (Lithol Scarlet 3700 of BASF) in a dissolver, then the calculated amount of a glycidyl compound (37.1 g of glycidyl compound No. 3 from Table 1) was admixed the mixtures were diluted with water to an outflow time of from 18 to 20 seconds (DIN 4 outflow cup), then printed with an intaglio printing press (model BT of Kochsiek) at room temperature onto polyethylene foil which had been pretreated for printing, and dried conventionally with hot air. Immediately after printing and drying, the printed foil was rewound on the press. No sticking or blocking was observed in later unwinding. After being stored for seven days at room temperature, the prints were subjected to a normal adhesion test, to an adhesion test after 24 hours storage of the prints in water, and to a crinkle test.

Description of testing methods

1. Adhesive strength

The testing for adhesive strength of ink films on a substrate is done with "Tesafilm" adhesive tape strips. In each case, 10 adhered strips are torn off quickly or slowly.

| Evaluation | | |
|---|---|---|
| 1 | Very good | (film flawless) |
| 2 | Good | (isolated dotlike defects) |
| 3 | Satisfactory | (visible defects) |
| 4 | Adequate | (wide area defects) |
| 5 | Unsatisfactory | (film destroyed; practically no adhesion) |

2. Crinkle test

In this test, the ink films on polyethylene which have been prepared and stored are immersed in water at 20° C. to 23° C. for 24 hours. Immediately after their removal from the medium, printed surfaces are rubbed against each other with the ball of the thumb under pressure to abrade and wrinkle them.

| Evaluation | |
|---|---|
| 1 | Ink film remains completely intact |
| 2 | Ink film has cracks |
| 3 | Ink film is detached in places |
| 4 | Ink film is practically destroyed |
| 5 | Ink film is detached in places even without having been rubbed |

TABLE 1

| No. | Glycidyl Compounds | Epoxy Value |
|---|---|---|
| 1 | Glycidyl ethers of hexanediol | 0.61 |
| 2 | Glycidyl ethers of neopentyl glycol | 0.67 |
| 3 | Glycidyl ethers of glycerol | 0.63 |
| 4 | Glycidyl ethers of diglycerol | 0.66 |
| 5 | Glycidyl ethers of trimethylolpropane | 0.43 |

TABLE 2

| No. | Amino Compounds | Molecular Weight | Amine Hydrogen Equivalent Weight |
|---|---|---|---|
| 1 | Ethylenediamine | 60 | 15 |
| 2 | Diethylenetriamine | 101 | 21 |
| 3 | Triethylenetetramine | 146 | 24 |
| 4 | Butanediol ether diamine | 202 | 50 |
| 5 | N-Aminoethylpiperazine | 129 | 43 |
| 6 | Ethanolamine | 61 | 31 |
| 7 | 2-Amino-2-methyl-1-propanol | 89 | 45 |
| 8 | Dipropylenetriamine | 131 | 27 |

TABLE 3

| No. | Thermoplastic Resins | Acid Number |
|---|---|---|
| 1 | Polyamide resin comprising dimerized fatty acid, isophthalic acid, ethylenediamine, and diaminodimethyl dicyclohexylmethane | 60 |
| 2 | Polyamide resin comprising dimerized fatty acid, isophthalic acid, ethylenediamine, and diaminodimethyl dicyclohexylmethane | 80 |
| 3 | Polyamide resin comprising adipic acid, stearic acid, and isophoronediamine | 100 |
| 4 | Polyamide resin comprising dimerized fatty acid, isophthalic acid, ethylenediamine, and butanediol ether diamine | 50 |
| 5 | Polyamide resin comprising dimerized fatty acid, isophthalic acid, ethylenediamine, isophoronediamine, and caprolactam | 70 |
| 6 | Polyamide resin comprising dimerized fatty acid, isophthalic acid, ethylenediamine, isophoronediamine, and 11-aminoundecanoic acid | 70 |
| 7 | Polysteramide comprising dimerized fatty acid, isophthalic acid, ethylenediamine, isophoronediamine, and ethanolamine | 100 |
| 8 | Polysteramide comprising dimerized fatty acid, isophthalic acid, ethylenediamine, isophoronediamine, and diglycolamine | 70 |
| 9 | Polysteramide comprising dimerized fatty acid, isophthalic acid, ethylenediamine, and dimethylolcyclohexane | 80 |
| 10 | Polyacrylate resin[1] | 200 |
| 11 | Vinyl acetate/crotonic acid copolymer[2] | 50 |
| 12 | Maleinate resin[3] | 200 |
| 13 | Rosin modified phenolic resin[4] | 160 |
| 14 | Linear, saturated, oil free polyester resin (phthalate resin)[5] | 100 |
| 15 | Copolymer of styrene and maleic ester[6] | 150 |

[1] "Joncryl 67" (Johnson Wax)
[2] "Mowilith CT5" (Hoechst)
[3] "Ropkramar 2051" (Kramer)
[4] "Ropkrapal SH" (Kramer)
[5] "Erkarex 1565" (Kramer)
[6] "Suprapal AP 20" (BASF)

TABLE 4

(Solutions Containing 30% Solids)

| No. | Glycidyl Compound Table 1 No. | g | Amine Compound Table 2 No. | g | Thermoplastic Resin Table 3 No. | g | Solvent Water g | Alcohol g | Other g |
|---|---|---|---|---|---|---|---|---|---|
| 1 | 1 | 2.6 | 1 | 1.0 | 1 | 15.0 | 23.0 | 22.7(1) | — |
|  |  |  | 7 | 1.0 |  |  |  |  |  |
| 2 | 3 | 3.4 | 1 | 1.3 | 2 | 15.0 | 25.0 | 23.3(1) | — |
|  |  |  | 7 | 1.0 |  |  |  |  |  |
| 3 | 1 | 4.4 | 1 | 1.6 | 3 | 15.0 | 25.0 | 26.3(3) | — |
|  |  |  | 7 | 1.0 |  |  |  |  |  |
| 4 | 2 | 3.2 | 1 | 1.3 | 2 | 15.0 | 25.0 | 24.7(3) | — |
|  |  |  | 7 | 1.8 |  |  |  |  |  |
| 5 | 4 | 3.3 | 1 | 1.3 | 2 | 15.0 | 35.0 | 25.4(2) | — |
|  |  |  | 6 | 2.0 |  |  |  |  |  |
| 6 | 5 | 3.8 | 1 | 1.0 | 1 | 15.0 | 24.4 | 23.6(2) | — |
|  |  |  | 7 | 1.0 |  |  |  |  |  |
| 7 | 1 | 3.5 | 2 | 2.2 | 2 | 15.0 | 26.0 | 26.7(2) | — |
|  |  |  | 7 | 1.8 |  |  |  |  |  |
| 8 | 1 | 2.7 | 3 | 2.3 | 1 | 15.0 | 27.0 | 27.8(2) | — |
|  |  |  | 7 | 2.0 |  |  |  |  |  |
| 9 | 1 | 3.5 | 5 | 2.8 | 2 | 15.0 | 26.0 | 16.0(2) | Dowanol PM* 10.0 |
|  |  |  | 7 | 1.0 |  |  |  |  |  |
| 10 | 1 | 2.7 | 4 | 3.2 | 1 | 15.0 | 29.0 | 28.9(2) | — |
|  |  |  | 7 | 2.0 |  |  |  |  |  |
| 11 | 1 | 7.0 | 1 | 2.6 | 2 | 15.0 | 28.7 | 28.7(2) | — |
| 12 | 1 | 2.6 | 1 | 1.0 | 1 | 15.0 | 4.6 | 41.1(1) | — |
|  |  |  | 7 | 1.0 |  |  |  |  |  |
| 13 | 1 | 2.6 | 1 | 1.0 | 1 | 15.0 | 36.1 | 4.6(2) | Butyl glycol 5.0 |
|  |  |  | 7 | 1.0 |  |  |  |  |  |
| 14 | 1 | 2.6 | 1 | 1.0 | 1 | 15.0 | 35.0 | — | 10.7 |
|  |  |  | 7 | 1.0 |  |  |  |  |  |
| 15 | 1 | 2.6 | 1 | 1.0 | 1 | 15.0 | 22.0 | 23.7(1) | — |
|  |  |  | 1 | 1.0 |  |  |  |  |  |

(1)Ethanol
(2)Isopropanol
(3)n-Propanol
*Propylene glycol monomethyl ether

| No. | Glycidyl Table 1 No. | g | Amine Table 2 No. | g | Resin Table 3 No. | g | Water g | Alcohol g | Other g |
|---|---|---|---|---|---|---|---|---|---|
| 16 | 1 | 2.6* | 1 | 1.0* | 1 | 15.0 | 22.0 | 23.7(3) | — |
|  |  |  | 7 | 1.0 |  |  |  |  |  |
| 17 | 1 | 2.6** | 1 | 1.0** | 1 | 15.0 | 22.0 | 23.7(3) | — |
|  |  |  | 7 | 1.0** |  |  |  |  |  |
| 18 | 1 | 2.6 | 1 | 1.0 | 1 | 15.0 | 23.0 | 23.9(3) | — |
|  |  |  | *** | 1.5 |  |  |  |  |  |
| 19 | 1 | 3.5 | 1 | 1.3 | 2 | 15.0 | 24.0 | 24.5(1) | — |
|  |  |  | **** | 1.0 |  |  |  |  |  |
| 20 | — | — | 1 | 2.0 | 2 | 15.0 | 19.0 | 20.6(3) | — |

(1)Ethanol
(2)Isopropanol
(3)n-Propanol
*Adduct formation was effected before thermoplastic resin 1 (Table 3) was dissolved
**The amines were used together to dissolve thermoplastic resin 1 (Table 3); only then did the adduct formation take place
***Ammonia
****Triethylamine

| No. | Glycidyl Table 1 No. | g | Amine Table 2 No. | g | Resin Table 3 No. | g | Water g | Alcohol g | Other g |
|---|---|---|---|---|---|---|---|---|---|
| 21 | 1 | 1.3 | 1 | 1.0 | 1 | 15.0 | 23.0 | 23.1(2) | — |
|  | * | 1.5 | 7 | 1.0 |  |  |  |  |  |
| 22 | 1 | 5.3 | 8 | 4.2 | 1 | 30.0 | 50.0 | 50.0(2) | — |
|  |  |  | 7 | 4.0 |  |  |  |  |  |
| 23 | 1 | 4.4 | 1 | 1.6 | 10 | 15.0 | 25.0 | 25.0(2) | — |
|  |  |  | 7 | 2.0 |  |  |  |  |  |
| 24 | 1 | 2.2 | 1 | 0.8 | 11 | 15.0 | 25.0 | 23.0(2) | 2.0(4) |
|  |  |  | 7 | 0.5 |  |  |  |  |  |
| 25 | 1 | 4.4 | 1 | 1.6 | 12 | 15.0 | 25.0 | 23.0(2) | 2.0(4) |
|  |  |  | 7 | 4.0 |  |  |  |  |  |
| 26 | 1 | 6.2 | 1 | 2.2 | 13 | 15.0 | 25.0 | 23.0(2) | 2.0(4) |
|  |  |  | 7 | 4.0 |  |  |  |  |  |
| 27 | 1 | 4.4 | 1 | 1.6 | 14 | 15.0 | 25.0 | 23.0(2) | 2.0(4) |
|  |  |  | 7 | 4.0 |  |  |  |  |  |
| 28 | 1 | 3.5 | 1 | 2.6 | 15 | 15.0 | 25.0 | 23.0(4) | 2.0(4) |
|  |  |  | 7 | 2.0 |  |  |  |  |  |
| 29 | 1 | 2.2 | 1 | 0.8 | 4 | 15.0 | 25.0 | 25.0(2) | — |
|  |  |  | 7 | 4.5 |  |  |  |  |  |
| 30 | 1 | 3.1 | 1 | 1.1 | 5 | 15.0 | 25.0 | 25.0(2) | — |
|  |  |  | 7 | 2.0 |  |  |  |  |  |
| 31 | 1 | 3.1 | 1 | 1.1 | 6 | 15.0 | 25.0 | 25.0(2) | — |
|  |  |  | 7 | 2.0 |  |  |  |  |  |
| 32 | 1 | 4.4 | 1 | 1.6 | 7 | 15.0 | 25.0 | 25.0(2) | — |
|  |  |  | 7 | 5.5 |  |  |  |  |  |
| 33 | 1 | 3.1 | 1 | 1.1 | 8 | 15.0 | 25.0 | 25.0(2) | — |
|  |  |  | 7 | 4.0 |  |  |  |  |  |

TABLE 4-continued (Solutions Containing 30% Solids)

| | Glycidyl Compound Table 1 | | Amine Compound Table 2 | | Thermo- plastic Resin Table 3 | | Solvent | | |
|---|---|---|---|---|---|---|---|---|---|
| | | | | | | | Water | Alcohol | Other |
| No. | No. | g | No. | g | No. | g | g | g | g |
| 34 | 1 | 3.5 | 1 | 1.3 | 9 | 15.0 | 25.0 | 25.0(2) | — |
| | | | 7 | 4.0 | | | | | |
| COMPARATIVE TESTS | | | | | | | | | |
| C₁ | — | | 7 | 2.5 | 2 | 15.0 | 20.0 | 20.8(2) | — |
| C₂ | — | | ** | 2.5 | 1 | 15.0 | 20.0 | 20.8(2) | — |
| C₃ | 1 | 3.5 | 6 | 1.3 | 2 | 15.0 | 24.0 | 25.2(2) | — |
| | | | 7 | 1.0 | | | | | |

(1)Ethanol
(2)Isopropanol
(3)n-Propanol
(4)Butyl glycol
*Butyl glycidyl ether
**Triethylamine

TABLE 5

| | Mixture Table 4 | | Glycidyl Compound Table 1 | | Tesa Test (1)After Storage at Room Temperature* | Tesa Test (1)After 24 Hours' Storage in Water** | Crinkle Test After 24 Hours' Storage in Water |
|---|---|---|---|---|---|---|---|
| No. | No. | g | No. | g | | | |
| 1 | 1 | 65.3 | 3 | 10.7 | 1–2 | 1–2 | 1 |
| 2 | 2 | 69.0 | 3 | 13.6 | 1 | 1–2 | 2 |
| 3 | 3 | 73.3 | 4 | 15.2 | 1–2 | 1–2 | 1–2 |
| 4 | 4 | 71.0 | 3 | 15.8 | 1–2 | 2 | 1–2 |
| 5 | 5 | 72.0 | 3 | 20.6 | 2 | 2 | 1 |
| 6 | 6 | 68.4 | 3 | 10.9 | 1–2 | 1–2 | 1–2 |
| 7 | 7 | 75.3 | 3 | 19.2 | 1 | 1–2 | 1–2 |
| 8 | 8 | 78.3 | 3 | 19.0 | 1–2 | 1–2 | 1–2 |
| 9 | 9 | 74.3 | 3 | 13.3 | 1–2 | 2 | 2 |
| 10 | 10 | 82.7 | 3 | 13.9 | 1–2 | 2 | 2 |
| 11 | 11 | 82.0 | 4 | 19.4 | 1 | 2 | 1 |
| 12 | 12 | 65.3 | 4 | 10.7 | 1 | 1–2 | 1 |
| 13 | 13 | 65.3 | 4 | 10.7 | 2 | 2 | 1 |
| 14 | 14 | 65.3 | 4 | 10.7 | 2 | 2 | 1 |
| 15 | 15 | 65.3 | 3 | 18.1 | 1–2 | 2 | 1–2 |
| 16 | 16 | 65.3 | 3 | 10.7 | 2 | 2 | 1 |
| 17 | 17 | 65.3 | 3 | 10.7 | 1–2 | 1–2 | 1–2 |
| 18 | 18 | 67.0 | 4 | 7.3 | 1–2 | 1–2 | 2 |
| 19 | 19 | 69.3 | 3 | 10.1 | 1 | 1–2 | 1–2 |
| 20 | 20 | 56.6 | 4 | 20.2 | 1–2 | 1–2 | 2 |
| 21 | 21 | 66.0 | 4 | 10.4 | 1–2 | 1–2 | 2 |
| 22 | 22 | 143.5 | 3 | 32.8 | 1 | 1–2 | 1–2 |
| 23 | 23 | 71.0 | 3 | 18.9 | 1 | 1–2 | 1 |
| 24 | 24 | 68.5 | 4 | 7.7 | 1–2 | 1–2 | 1 |
| 25 | 25 | 75.0 | 4 | 24.5 | 1–2 | 2 | 1–2 |
| 26 | 26 | 75.4 | 3 | 30.0 | 1 | 1–2 | 1 |
| 27 | 27 | 73.0 | 3 | 25.1 | 2 | 2 | 1 |
| 28 | 28 | 73.1 | 3 | 19.1 | 2 | 2 | 1 |
| 29 | 29 | 70.1 | 3 | 20.3 | 1–2 | 2 | 1–2 |
| 30 | 30 | 71.2 | 3 | 15.1 | 2 | 2 | 1 |
| 31 | 31 | 71.2 | 3 | 15.1 | 1–2 | 1–2 | 1–2 |
| 32 | 32 | 73.0 | 3 | 29.8 | 1–2 | 1–2 | 1–2 |
| 33 | 33 | 71.2 | 3 | 21.3 | 2 | 2 | 2 |
| 34 | 34 | 71.8 | 3 | 22.6 | 1–2 | 1–2 | 1–2 |
| COMPARATVE TESTS | | | | | | | |
| C₁ | C₁ | 58.3 | 3 | 7.7 | 1–2 | 4–5 | 5 |
| C₂ | C₂ | 58.3 | — | — | 1–2 | 3–4 | 5 |
| C₃ | C₃ | 70.0 | 3 | 6.5 | 1 | 4–5 | 4 |

*Standard climate (23° C./50% relative humidity)
**Desalinated water, 23° C.
(1)1 = Very good (film flawless)
2 = Good (isolated dotlike defects)
3 = Satisfactory (visible defects)
4 = Adequate (wide-area defects)
5 = Unsatisfactory (film destroyed)

What is claimed is:

1. A method for coating or printing a substrate, which method comprises applying to said substrate a hardenable coating or printing ink vehicle which is a solution comprising (I) an aqueous solvent and, dissolved therein,
(II) a mixture of water soluble components comprising
   (A) an aliphatic glycidyl compound having an epoxy value from 0.4 to 0.7 and more than one epoxy group per molecule;

(B) an amine component, reactive with said glycidyl compound as a hardener therefor at or slightly above room temperature, in an amount such that the ratio of epoxy groups in said glycidyl compound to amino hydrogen atoms in said amine component is from 0.5:1 to 1.5:1, said amine component being at least one member selected from the group consisting of (1) aliphatic amines of the formula $H_2N-(CHR)_x-NH_2$, wherein R is hydrogen or alkyl having from 1 to 4 carbon atoms and x is an integer from 2 to 6, (2) polyalkylene polyamines of the formula $H_2N-[(CHR)_x]_y-H_1$ wherein R and X have the meanings given above and y is an integer from 2 to 4, (3) polyether amines of the formula $H_2N-(CH_2)_n-O-(R^1-O)_z-(CH_2)_n-NH_2$, wherein $R^1$ is substituted or unsubstituted alkyl having 1 to 4 carbon atoms, z is 0, 1, 2, or 3, and n is an integer from 2 to 5, (4) heterocyclic amines of the formula

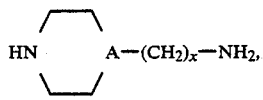

wherein A is C or N and x is an integer from 2 to 6, (5) an alkanolamine of the formula $H_2N-R^2-OH$, wherein $R^2$ is $-(CRR)_x$ and R and x have the meaning given above, or $R^2$ is $-(CH_2)_2-O-(CH_2)_2-$, and (6) adducts having free amino groups and formed between
 (a) an aliphatic glycidyl compound as in (A) and
 (b) from 0.8 to 1.2 moles, per epoxy group of (a), of
  (i) at least one of said amines (B)(1) to (B)(4), or
  (ii) at least one of said amines (B)(1) to (B)(4) containing amine (B)(5) in an amount up to 50 equivalent percent; and (C) a thermoplastic resin having free carboxyl groups which is inert at the room temperature hardening conditions or at the hardening conditions slightly above room temperature at which the epoxy compound (II)(A) is cured and which has an acid number from 40 to 200, in an amount such that there are from 1 to 10 amine groups of one or more of the amines according to (B) per carboxyl group present in (C), evaporating the solvent from said vehicle to form a film, and then maintaining said film at or slightly above room temperature to harden it.

2. A method as in claim 1 wherein said aliphatic glycidyl compound is an ether of hexanediol, neopentyl glycol, trimethylolpropane, glycerol, diglycerol, or pentaerythritol.

3. A method as in claim 1 wherein one mole of amine (B)(6)(b) is used per epoxy group of aliphatic glycidyl compound (B)(6)(a) to form adduct (B)(6).

4. A method as in claim 1 wherein said amine component (B) comprises an adduct (B)(6) formed between amines (B)(1) and (B)(2) and an aliphatic glycidyl compound (B)(6)(a) member selected from the group consisting of glycidyl ethers of hexanediol, glycerol, and diglycerol.

5. A method as in claim 4 wherein approximately 1 mole of amine is reacted per epoxy group of said glycidyl ether to form said adduct.

6. A method as in claim 1 wherein said thermoplastic resin (C) has an acid number from 50 to 120 and is a member selected from the group consisting of polyacrylates, polymethacrylates, polyaminoamides formed between polymerized fatty acids and a polyamine, and polyesteramides formed between polymerized fatty acids and a component which contains both amino and hydroxy groups and comprises one or more members selected from the group consisting of alkanolamines, polyamines, and polyols.

7. A method as in claim 6 wherein an amount of amine component (B) is used which will contribute from 1 to 4 amino groups per carboxyl group of resin (C).

8. A method as in claim 1 wherein the amounts of amine glycidyl compound and amine component are such that the ratio of the number of glycidyl groups to the number of amine hydrogen atoms is from 0.5:1 to 1.5:1.

9. A method as in claim 1 wherein said amine component (B) comprises amines (B)(1) and (B)(2).

* * * * *